*(12)* United States Patent
Huang et al.

(10) Patent No.: US 8,349,494 B2
(45) Date of Patent: Jan. 8, 2013

(54) ELECTRODE COMPOSITE MATERIAL, METHOD FOR MAKING THE SAME, AND LITHIUM ION BATTERY USING THE SAME

(75) Inventors: Xian-Kun Huang, Beijing (CN); Xiang-Ming He, Beijing (CN); Chang-Yin Jiang, Beijing (CN); Dan Wang, Beijing (CN); Jian Gao, Beijing (CN); Jian-Jun Li, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/106,999

(22) Filed: May 13, 2011

(65) Prior Publication Data

US 2012/0028115 A1 Feb. 2, 2012

Related U.S. Application Data

(63) Continuation of application No. 13/092,135, filed on Apr. 21, 2011.

(30) Foreign Application Priority Data

| Aug. 2, 2010 | (CN) | 2010 1 0242522 |
| Aug. 2, 2010 | (CN) | 2010 1 0242531 |
| Aug. 2, 2010 | (CN) | 2010 1 0242541 |
| Oct. 14, 2010 | (CN) | 2010 1 0507158 |
| Oct. 15, 2010 | (CN) | 2010 1 0509983 |
| Oct. 15, 2010 | (CN) | 2010 1 0510350 |
| Nov. 3, 2010 | (CN) | 2010 1 0529980 |

(51) Int. Cl.
*H01M 4/58* (2010.01)
(52) U.S. Cl. ............... 429/231.3; 429/231.1; 429/223; 427/58; 252/182.1
(58) Field of Classification Search ............. 429/231.1, 429/223, 231.3; 427/58; 252/182.1
See application file for complete search history.

(56) References Cited

U.S. PATENT DOCUMENTS 7,326,498 B2 2/2008 Park et al.

OTHER PUBLICATIONS

Ma et al. "Effect of AlPO4 coating on the electrochemical properties of LiNi0.08Co0.202 cathode material", Journal of Alloys and compounds, 2008, 453(1-2), pp. 352-355.*
Hu et al. "Comparison of AlPO4-and Co3(PO4)2-coated LiNi0. 8Co0.2 cathode materials for Li-ion battery", Electrochimica Acta (2008), 53(5), pp. 2567-2573.*
J.Cho "Correlation between AlPO4 nanoparticle coating thickness on LiCoO2 cathode and thermal stablility", Electrochimica Acta, 48 (2003), 2807-2811.

* cited by examiner

*Primary Examiner* — Laura Weiner
(74) *Attorney, Agent, or Firm* — Altis Law Group, Inc.

(57) ABSTRACT

A cathode composite material includes a cathode active material particle having a surface, and a continuous aluminum phosphate layer coated on the surface of the cathode active material particle. A material of the cathode active material particle is layered type lithium nickel oxide. The present disclosure also relates to a lithium ion battery and a method for making the cathode composite material.

11 Claims, 20 Drawing Sheets

ELECTRODE COMPOSITE MATERIAL, METHOD FOR MAKING THE SAME, AND LITHIUM ION BATTERY USING THE SAME

CROSS-REFERENCE TO RELATED APPLICATIONS

This application claims all benefits accruing under 35 U.S.C. §119 from China Patent Application No. 201010242522.4, filed on Aug. 2, 2010, No. 201010510350.4, filed on Oct. 15, 2010, No. 201010529980.6, filed on Nov. 3, 2010, No. 201010242531.3, filed on Aug. 2, 2010, No. 201010507158.X, filed on Oct. 14, 2010, No. 201010509983.3, filed on Oct. 15, 2010, No. 201010242541.7, filed on Aug. 2, 2010, in the China Intellectual Property Office, the contents of which are hereby incorporated by reference. This application is related to commonly-assigned applications entitled, "ELECTRODE COMPOSITE MATERIAL, METHOD FOR MAKING THE SAME, AND LITHIUM ION BATTERY USING THE SAME", filed Apr. 29, 2011, application Ser. No. 13/097406; "ELECTRODE COMPOSITE MATERIAL, METHOD FOR MAKING THE SAME, AND LITHIUM ION BATTERY USING THE SAME", filed Apr. 29, 2011, application Ser. No. 13/097397, "LITHIUM TITANATE COMPOSITE MATERIAL, METHOD FOR MAKING THE SAME, AND LITHIUM ION BATTERY USING THE SAME", filed May 3, 2011, application Ser. No. 13/099383, "LITHIUM TITANATE COMPOSITE MATERIAL, METHOD FOR MAKING THE SAME, AND LITHIUM ION BATTERY USING THE SAME", filed May 3, 2011, application Ser. No. 13/099382. This application is a continuation of U.S. patent application Ser. No. 13/092135, filed on Apr. 21, 2011, entitled, "ELECTRODE COMPOSITE MATERIAL, METHOD FOR MAKING THE SAME, AND LITHIUM ION BATTERY USING THE SAME".

BACKGROUND

1. Technical Field

The present disclosure relates to electrode active materials used in rechargeable lithium ion batteries and, particularly, to an electrode composite material, a method for making the same, and a rechargeable lithium ion battery using the same.

2. Description of Related Art

A common method to improve the properties of cathode active materials of lithium batteries is to treat the surface of the materials. For example, compared to untreated $LiFePO_4$, the carbon coated $LiFePO_4$ particles has improved conductivity. In another example, research has shown that composite material having $AlPO_4$ coated $LiCoO_2$ has a relatively high thermodynamic stability.

The method for forming the composite material includes preparing an amount of dispersed small $AlPO_4$ particles in water, adding large $LiCoO_2$ particles in the water having the small $AlPO_4$ particles. The small $AlPO_4$ particles adhere to the surface of the large $LiCoO_2$ particles. The water is then evaporated and the $LiCoO_2$ particles with the $AlPO_4$ particles absorbed thereon are heated at about 700° C. to form the composite material.

However, $AlPO_4$ is insoluble in water. Therefore, in the above method, small $AlPO_4$ particles may not disperse sufficiently in the water and could aggregate together. Further, when a large amount of the $LiCoO_2$ particles is added in the water, the $LiCoO_2$ particles added earlier in time will absorb the majority of the $AlPO_4$ particles in the water, and the subsequently added $LiCoO_2$ particles may not have enough $AlPO_4$ particles to absorb. The uneven absorption occurs most often when adding a relatively large amount of $LiCoO_2$ particles, which is a problem for industrialization of this composite material. Furthermore, even though it may appear that the $LiCoO_2$ is coated well, a microscopic view of the $AlPO_4$ may show that the small particles coated on the surface of the $LiCoO_2$ large particle do not form a uniform $AlPO_4$ substance layer. Accordingly, the lithium ion battery using the composite material formed by the above method in the cathode electrode has a low cycling stability, especially in industry use.

What is needed, therefore, is to provide an electrode composite material having a uniform protective layer coated on the electrode active materials, a method for making the same, and a lithium ion battery using the same.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
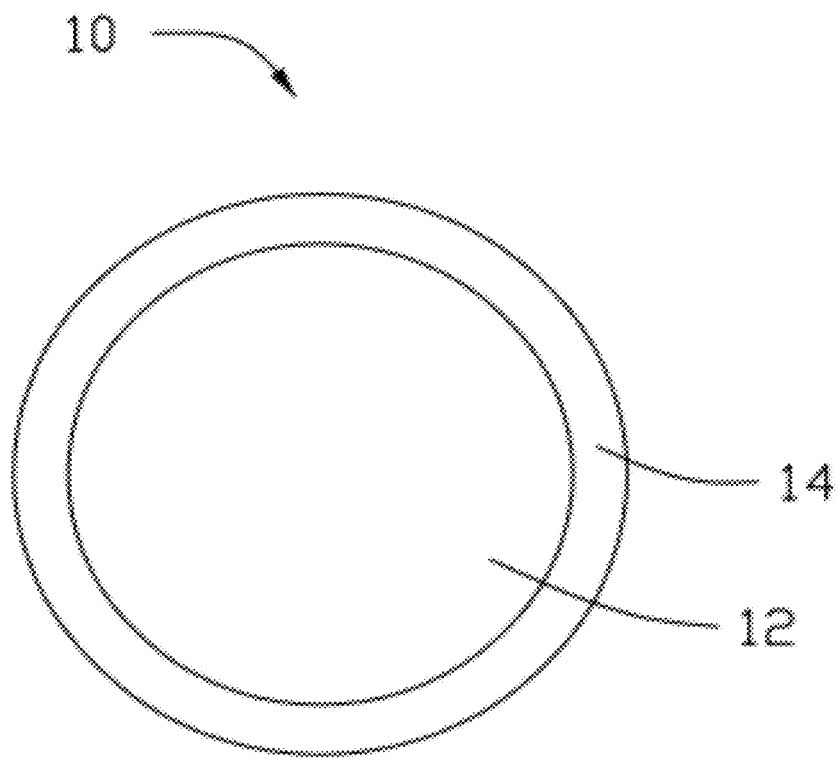
FIG. 1 is a view of an embodiment of an electrode composite material of a lithium ion battery.

Referring to FIG. 1, one embodiment of an electrode composite material 10 of a lithium ion battery includes an electrode active material particle 12 and an AlPO$_4$ layer 14 coated on a surface of the electrode active material particle 12. A mass percentage of the AlPO$_4$ layer 14 to the electrode composite material 10 can be in a range from about 0.1% to about 3%. A thickness of the AlPO$_4$ layer 14 can be in a range from about 5 nanometers (nm) to about 20 nm. The AlPO$_4$ layer 14 is an in situ formed layer on the surface of the electrode active material particle 12, and is a continuous material layer of AlPO$_4$ having a uniform thickness. Further, the interfacial diffusion may occur at the interface between the AlPO$_4$ layer 14 and the electrode active material particle 12, and transition metal atoms of the electrode active material particle 12 may diffuse into the AlPO$_4$ layer 14.

In one embodiment, the electrode composite material 10 is a cathode composite material. The cathode composite material includes a plurality of cathode composite particles. One cathode composite particle includes a cathode active material particle as the electrode active material particle 12 and an AlPO$_4$ layer 14 coated on a surface of the cathode active material particle.

In another embodiment, the electrode composite material 10 is an anode composite material. The anode composite material includes a plurality of anode composite particles. One anode composite particle includes an anode active material particle as the electrode active material particle 12 and an AlPO$_4$ layer 14 coated on a surface of the anode active material particle.

The cathode active material particle can be spinel type lithium manganese oxide, olivine type lithium iron phosphate, layered type lithium manganese oxide, layered type lithium nickel oxide, layered type lithium cobalt oxide, layered type lithium nickel manganese oxide, layered type lithium nickel cobalt manganese oxide, or any combination thereof. The lithium transition metal oxide can be doped or undoped.

The layered type lithium nickel oxide can be represented by a chemical formula of Li$_x$Ni$_{1-y}$L$_y$O$_2$ (1). The layered type lithium cobalt oxide can be represented by a chemical formula of Li$_x$Co$_{1-y}$L$_y$O$_2$ (2). The layered type lithium manganese oxide can be represented by a chemical formula of Li$_x$Mn$_{1-y}$L$_y$O$_2$ (3). The olivine type lithium iron phosphate can be represented by a chemical formula of Li$_x$Fe$_{1-y}$L$_y$PO$_4$ (4). The layered type lithium nickel manganese oxide can be represented by a chemical formula of Li$_x$Ni$_{0.5+z-a}$Mn$_{1.5-z-b}$L$_a$R$_b$O$_4$ (5). The layered type lithium nickel cobalt manganese oxide can be represented by a chemical formula of Li$_x$Ni$_c$Co$_d$Mn$_e$L$_f$O$_2$ (6). The spinel type lithium manganese oxide can be represented by a chemical formula of Li$_x$Mn$_{2-i}$L$_i$O$_4$ (7). In the aforementioned chemical formulas (1) through (7), $0.1 \leq x \leq 1.1$, $0 \leq y < 1$, $0 \leq z < 1.5$, $0 \leq a-z < 0.5$, $0 \leq b+z < 1.5$, $0 < c < 1$, $0 < d < 1$, $0 < e < 1$, $0 \leq f \leq 0.2$, $c+d+e+f=1$, and $0 \leq i < 2$. M and R represent at least one of the chemical elements of alkali metal elements, alkaline-earth metal elements, Group-13 elements, Group-14 elements, transition metal elements, and rare-earth elements. In one embodiment, L and R represent at least one of the chemical elements of manganese (Mn), nickel (Ni), chromium (Cr), cobalt (Co), vanadium (V), titanium (Ti), aluminum (Al), iron (Fe), gallium (Ga), neodymium (Nd), and magnesium (Mg). In one embodiment, $0 \leq z < 0.1$. In another embodiment, $0.1 < y < 0.5$.

The anode active material particle can be lithium titanate, graphite, acetylene black, organic cracking carbon, mesocarbon microbeads (MCMB), or any combination thereof. More specifically, the lithium titanate can be doped or undoped spinel lithium titanate. The undoped lithium titanate can be represented by a chemical formula of Li$_4$Ti$_5$O$_{12}$. The doped lithium titanate can be represented by a chemical formula of Li$_{(4-g)}$A$_g$Ti$_5$O$_{12}$ (8) or Li$_4$A$_h$Ti$_{(5-h)}$O$_{12}$ (9), wherein $0 < g \leq 0.33$ and $0 < h \leq 0.5$. In the formulas (8) and (9), A represents at least one of the chemical elements of alkali metal elements, alkaline-earth metal elements, Group-13 elements, Group-14 elements, transition metal elements, and rare-earth elements. In one embodiment, A represents at least one of the chemical elements of Mn, Ni, Cr, Co, V, Ti, Al, Fe, Ga, Nd, and Mg.

In one embodiment, the material of the electrode active material particle 12 can be layered type lithium cobalt oxide (Li$_x$CoO$_2$), layered type lithium manganese oxide (Li$_x$MnO$_2$), or olivine type lithium iron phosphate (Li$_x$FePO$_4$). In another embodiment, the material of the electrode active material particle 12 can be represented by one of chemical formulas of LiNi$_{0.5}$Mn$_{1.5}$O$_4$, LiNi$_{0.8}$Co$_{0.15}$Al$_{0.05}$O$_2$, and LiNi$_{1/3}$Co$_{1/3}$Mn$_{1/3}$O$_2$.

A diameter of the electrode active material particle 12 can be in a range from about 100 nanometers to about 100 microns. In one embodiment, the diameter of the electrode active material particle 12 can be in a range from about 1 micron to about 20 microns.

One embodiment of a method for preparing the electrode composite material 10 of the lithium ion battery includes steps of:

S1, providing an aluminum nitrate (Al(NO$_3$)$_3$) solution;

S2, introducing a plurality of electrode active material particles 12 into the Al(NO$_3$)$_3$ solution, and mixing the plurality of electrode active material particles 12 with the Al(NO$_3$)$_3$ solution to form a mixture;

S3, adding a phosphate solution into the mixture to react with the Al(NO$_3$)$_3$ solution and form an aluminum phosphate layer on surfaces of the electrode active material particles 12; and S4, heat treating the electrode active material particles 12 with the aluminum phosphate layer formed on the surfaces thereof.

The Al(NO$_3$)$_3$ solution includes liquid phase solvent and Al(NO$_3$)$_3$ dissolved in the solvent. The solvent can dissolve the Al(NO$_3$)$_3$, dissociating the Al(NO$_3$)$_3$ into Al$^{3+}$ and NO$_3^-$. Therefore, the solvent is not limited to water, and can be other volatile organic solvent. In one embodiment, the solvent can be at least one of ethanol, acetone, chloroform, diethyl ether, dichloromethane, and ethylidene chloride. A reaction may occur between the electrode active material particles 12 and the water thereby deteriorating the performance of the electrode active material particles 12. The organic solvent may avoid this unwanted reaction.

In the step S2, the electrode active material particles 12 cannot be dissolved in the Al(NO$_3$)$_3$ solution. A mixing of the electrode active material particles 12 and the Al(NO$_3$)$_3$ solution forms a mixture containing both liquid phase and solid phase. In the mixture, a layer of Al$^{3+}$ is uniformly coated on the surface of the electrode active material particle 12. The Al$^{3+}$ ions can be uniformly adhered to the surface of the electrode active material particle 12 to form a coating layer at the atomic level. Further, the amount of the electrode active material particles 12 introduced to the Al(NO$_3$)$_3$ solution can be controlled according to the amount of the Al$^{3+}$ ions in the Al(NO$_3$)$_3$ solution, such that the amount of the Al$^{3+}$ ions is just sufficient to coat all the surfaces of the electrode active material particles 12. The mixture can be pasty. The pasty mixture is formed when the amount of the Al(NO$_3$)$_3$ solution is just enough to coat the entire surfaces of the electrode active material particles 12. The pasty mixture can be formed by controlling a volumetric ratio of the Al(NO$_3$)$_3$ solution and the electrode active material particles 12. In one embodiment, the volumetric ratio of the Al(NO$_3$)$_3$ solution and the electrode active material particles 12 can be in a range from about 1:10 to about 1:40. A diameter of the electrode active material particles 12 can be smaller than 20 microns. The amount of the Al(NO$_3$)$_3$ in the mixture can be determined from the amount of the aluminum phosphate layer to be formed on the surface of the electrode active material particles 12. In one embodiment, a mass percentage of the aluminum phosphate layer in the electrode composite material 10 can be in a range from about 0.1% to about 3%.

In the step S3, the phosphate solution includes a liquid phase solvent (e.g., water), and a phosphate that can dissolve in the solvent. The phosphate can be monoammonium phosphate (NH$_4$H$_2$PO$_4$), diammonium phosphate ((NH$_4$)$_2$HPO$_4$), ammonium phosphate ((NH$_4$)$_3$PO$_4$), phosphoric acid (H$_3$PO$_4$), or combinations thereof. The phosphate solution can include phosphate radical ions such as phosphate ion (PO$_4^{3-}$), dihydrogen phosphate ion (H$_2$PO$_4^-$), hydrogen phosphate ion (HPO$_4^{2-}$), and combinations thereof, dissociated from the phosphate. The phosphate solution is added to the pasty mixture and the phosphate radical ions react with the Al$^{3+}$ located about the surface of the electrode active material particle 12. Thus, a uniform aluminum phosphate layer can be formed on the surface of the electrode active material particle 12 in situ. In one embodiment, the phosphate solution can be added to the pasty mixture drop by drop, while stirring the mixture, to react the phosphate radical ions entirely and evenly with the Al$^{3+}$ on the surface of the electrode active material particle 12. Similar to the AlPO$_4$ solution, the amount of the phosphate solution can be determined from the amount of the aluminum phosphate layer to be formed on the surface of the electrode active material particle 12.

In the step S4, the heat treating step can firmly combine the aluminum phosphate layer and the electrode active material particle 12 at the interfaces therebetween, to form the electrode composite material. Meanwhile, the residual solvent and other reacting products (e.g. ammonium nitrate (NH$_4$NO$_3$)) can be removed from the final product. In addition, interface diffusion between the aluminum phosphate layer and the electrode active material particle 12 may be occurred during the heat treating. The transition metal atoms of the electrode active material particle 12 may be diffused into the aluminum phosphate layer. The heat treating temperature can be in a range from about 400° C. to about 800° C. A heat treating time period can be in a range from about 0.5 hours to about 2 hours.

In the method, the electrode active material particles 12 are previously introduced to the Al(NO$_3$)$_3$ solution, and then the phosphate is added to react with the Al$^{3+}$ on the surfaces of the electrode active material particles 12, to in situ form the AlPO$_4$ layer coated on the electrode active material particles 12. The liquid phase of Al(NO$_3$)$_3$ solution is mixed with the solid phase of electrode active material particles 12. Therefore, the Al$^{3+}$ can be uniformly coated on the surfaces of the electrode active material particles 12. Accordingly, the in situ formed aluminum phosphate layer can also be uniformly coated on the surfaces of the electrode active material particles 12. Instead of forming the AlPO$_4$ particles and then absorbing the AlPO$_4$ particles by the surfaces of the electrode active material particles 12, the present method avoids the uneven absorption between the solid phase of AlPO$_4$ and the solid phase of electrode active material particles 12. Therefore, the present method avoids an uneven coating of the electrode active material particles 12. By using the method, the AlPO$_4$ layer 14 can coat a single electrode active material particle 12, and each of the electrode active material particles 12 that is subsequently introduced can have the AlPO$_4$ layer 14 coated on the surface thereof. Thus, the method is suitable for industrialization. In addition, the in situ formed AlPO$_4$ layer 14 is an integrated and continuous material layer having uniform thickness, not just a plurality of AlPO$_4$ particles joined together. In the lithium ion battery, the AlPO$_4$ layer 14 can prevent an electron migration between the electrolyte and the electrode active material particles 12 and allow the lithium ions to pass therethrough. Thus, the side reaction during the charge and discharge of the lithium ion battery between the electrolyte and the electrode active material particles 12 can be suppressed. Therefore, the electrode composite material has improved chemical and thermal stabilities, even at a relatively high or low charge/discharge voltage, or a high rate.

One embodiment of a lithium ion battery includes a cathode, an anode, and a non-aqueous electrolyte disposed between the cathode and the anode. The cathode electrode includes a cathode current collector and a cathode material layer disposed on a surface of the cathode current collector. The anode electrode includes an anode current collector and an anode material layer disposed on a surface of the anode current collector.

In one embodiment, the cathode material layer can include at least one of the aforementioned cathode composite materials, a conductive agent, and a binder. In another embodiment, the anode material layer can include at least one of the aforementioned anode composite materials, a conductive agent, and a binder. The conductive agent can be at least one of acetylene black, carbon fibers, carbon nanotubes, and graphite. The binder can be at least one of polyvinylidene fluoride (PVDF), polytetrafluoroethylene (PTFE), and styrene-butadiene rubber (SBR). The non-aqueous electrolyte can be a solid film or a solution including a lithium salt dissolved in an organic solvent. The lithium salt may be at least one of $LiPF_6$, LiBOB, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, LiCl, and LiI. The organic solvent can be a cyclic carbonate and linear carbonate, and can be at least one of ethylene carbonate (EC), propylene carbonate (PC), ethylmethyl carbonate (EMC), diethyl carbonate (DEC), and dimethyl carbonate (DMC). The lithium ion battery can further include a porous membrane or a separator located between the cathode electrode and the anode electrode. The material of the separator can be polypropylene (PP) or polyethylene (PE). The lithium ion battery can further include an exterior encapsulating structure such as a hard battery case or a soft encapsulating bag. The lithium ion battery can further include a connecting component achieving an electrical connection between the current collector of the lithium ion battery and the external circuit.

EXAMPLES

Cathode Composite Material

Example 1

In Example 1, the cathode composite material is an $AlPO_4$—$LiCoO_2$ composite material including $LiCoO_2$ particles and an $AlPO_4$ layer 14 coated on a surface of each of the $LiCoO_2$ particles. The mass percentage of the $AlPO_4$ layer in the cathode composite material is about 1%.

Figure 2:
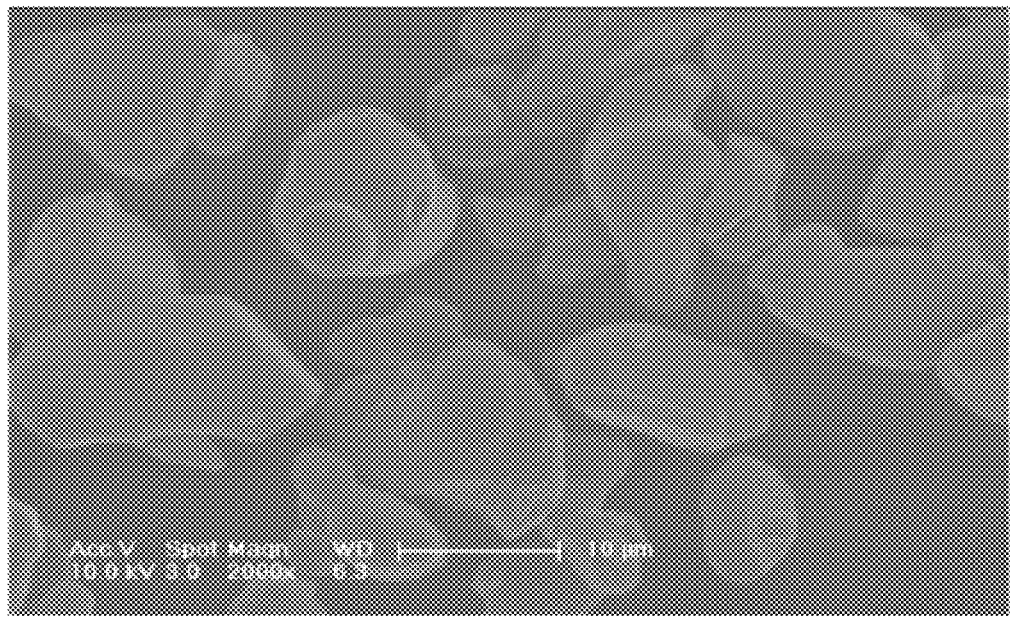
FIG. 2 shows a Scanning Electron Microscope (SEM) image of an embodiment of $AlPO_4$ coated $LiCoO_2$ particles.
Figure 3:
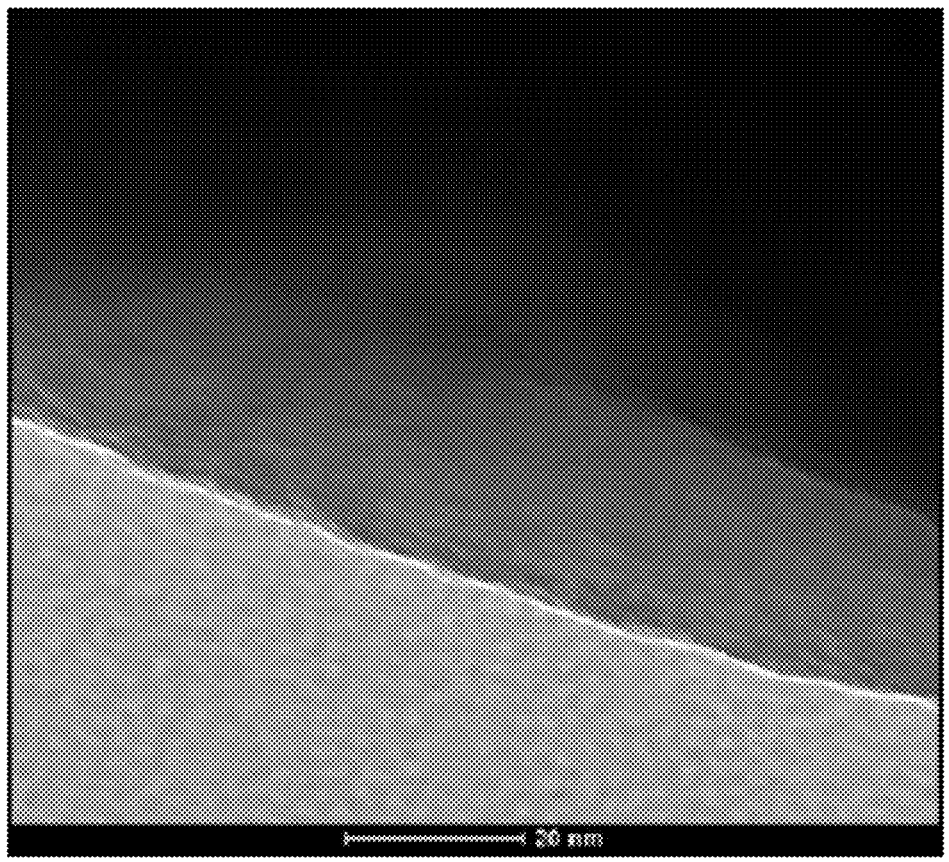
FIG. 3 shows a Transmission Electron Microscope (TEM) image of an embodiment of a $AlPO_4$ coated $LiCoO_2$ particle surface.

In the method of preparing the cathode composite material, $Al(NO_3)_3$ is dissolved in ethanol to form the $Al(NO_3)_3$ solution. 100 g of $LiCoO_2$ particles is introduced to the 30 mL and 0.16 mol/L of $Al(NO_3)_3$ solution, and stirred to form a pasty mixture. Water solution of $(NH_4)_2HPO_4$ is added to the pasty mixture drop by drop. Then, the mixture is uniformly stirred until the $AlPO_4$ is totally precipitated on the surfaces of the $LiCoO_2$ particles. The $LiCoO_2$ particles coated by the $AlPO_4$ layer are heated at about 400° C. Referring to FIG. 2 of the SEM photo, in the product, the $AlPO_4$ layer is uniformly coated on the surface of the $LiCoO_2$ particle. Referring to FIG. 3 of the TEM photo, the $AlPO_4$ layer formed is a material layer having uniform thickness coated on the surface of the $LiCoO_2$ particle.

Example 2

In Example 2, the cathode composite material is an $AlPO_4$—$LiCoO_2$ composite material prepared in the same method as in Example 1, except for heating the $LiCoO_2$ particles coated by the $AlPO_4$ layer at about 500° C.

Example 3

In Example 3, the cathode composite material is an $AlPO_4$—$LiCoO_2$ composite material prepared in the same method as in Example 1, except for heating the $LiCoO_2$ particles coated by the $AlPO_4$ layer at about 600° C.

Example 4

In Example 4, the cathode composite material is an $AlPO_4$—$LiCoO_2$ composite material prepared in the same method as in Example 1, except that the mass percentage of the $AlPO_4$ layer in the cathode composite material is about 1.5% and the $LiCoO_2$ particles coated by the $AlPO_4$ layer are heated at about 600° C.

Example 5

In Example 5, the cathode composite material is an $AlPO_4$—$LiMn_2O_4$ composite material including $LiMn_2O_4$ particles and an $AlPO_4$ layer 14 coated on a surface of each of the $LiMn_2O_4$ particles. The $AlPO_4$—$LiMn_2O_4$ composite material is prepared in the same method as in Example 3, except that the $LiCoO_2$ particles in Example 3 are replaced by the $LiMn_2O_4$ particles.

Example 6

In Example 6, the cathode composite material is an $AlPO_4$—$LiNi_{0.5}Mn_{1.5}O_4$ composite material including $LiNi_{0.5}Mn_{1.5}O_4$ particles and an $AlPO_4$ layer 14 coated on a surface of each of the $LiNi_{0.5}Mn_{1.5}O_4$ particles. The $AlPO_4$—$LiNi_{0.5}Mn_{1.5}O_4$ composite material is prepared in the same method as in Example 3, except that the $LiCoO_2$ particles in Example 3 are replaced by the $LiNi_{0.5}Mn_{1.5}O_4$ particles, and the mass percentage of the $AlPO_4$ layer in the cathode composite material is about 0.5%.

Example 7

In Example 7, the cathode composite material is an $AlPO_4$—$LiNiO_2$ composite material including $LiNiO_2$ particles and an $AlPO_4$ layer 14 coated on a surface of each of the $LiNiO_2$ particles. The $AlPO_4$—$LiNiO_2$ composite material is prepared in the same method as in Example 4, except that the $LiCoO_2$ particles in Example 4 are replaced by the $LiNiO_2$ particles.

Example 8

In Example 8, the cathode composite material is an $AlPO_4$—$LiNi_{0.8}Co_{0.15}Al_{0.05}O_2$ composite material including $LiNi_{0.8}Co_{0.15}Al_{0.05}O_2$ particles and an $AlPO_4$ layer 14 coated on a surface of each of the $LiNi_{0.8}Co_{0.15}Al_{0.05}O_2$ particles. The $AlPO_4$—$LiNi_{0.8}Co_{0.15}Al_{0.05}O_2$ composite material is prepared in the same method as in Example 4, except that the $LiCoO_2$ particles in Example 4 are replaced by the $LiNi_{0.8}Co_{0.15}Al_{0.05}O_2$ particles.

Example 9

In Example 9, the cathode composite material is an $AlPO_4$—$LiNi_{1/3}Co_{1/3}Mn_{1/3}O_2$ composite material including $LiNi_{1/3}Co_{1/3}Mn_{1/3}O_2$ particles and an $AlPO_4$ layer 14 coated on a surface of each of the $LiNi_{1/3}Co_{1/3}Mn_{1/3}O_2$ particles. The $AlPO_4$—$LiNi_{1/3}Co_{1/3}Mn_{1/3}O_2$ composite material is prepared in the same method as in Example 3, except that the $LiCoO_2$ particles in Example 3 are replaced by the $LiNi_{1/3}Co_{1/3}Mn_{1/3}O_2$ particles.

Anode Composite Material

Example 10

In Example 10, the anode composite material is an $AlPO_4$—$Li_4Ti_5O_{12}$ composite material including $Li_4Ti_5O_{12}$ particles and an $AlPO_4$ layer 14 coated on a surface of each of the $Li_4Ti_5O_{12}$ particles. The $AlPO_4$—$Li_4Ti_5O_{12}$ composite material is prepared in the same method as in Example 4, except that the LiCoO$_2$ particles in Example 4 are replaced by the Li$_4$Ti$_5$O$_{12}$ particles.

Comparative Example 1

Figure 4:
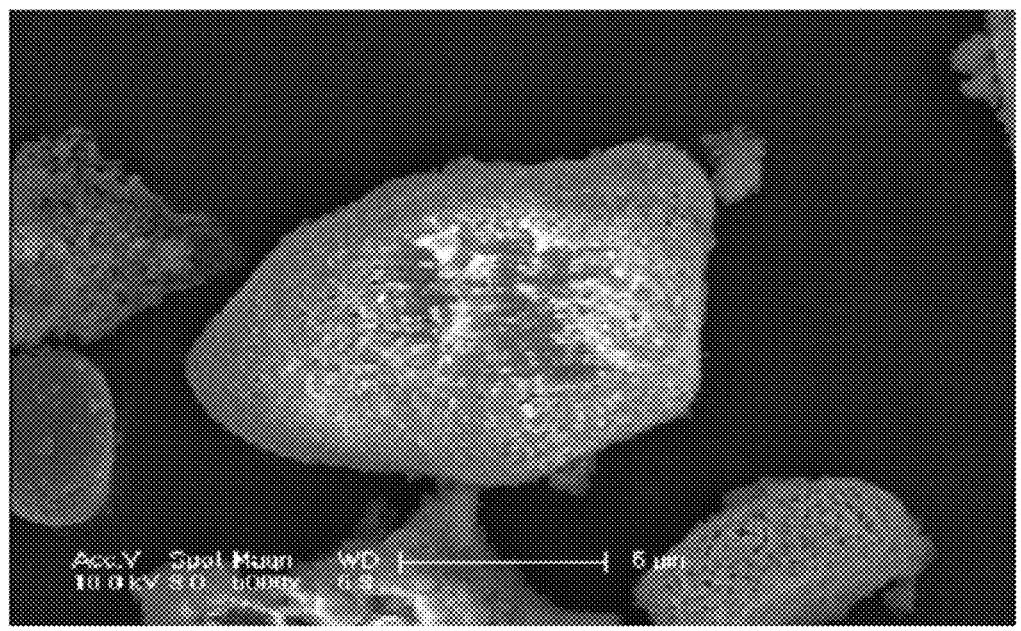
FIG. 4 shows a Scanning Electron Microscope (SEM) image on high magnification of a comparative example of $AlPO_4$ coated $LiCoO_2$ particles.
Figure 5:
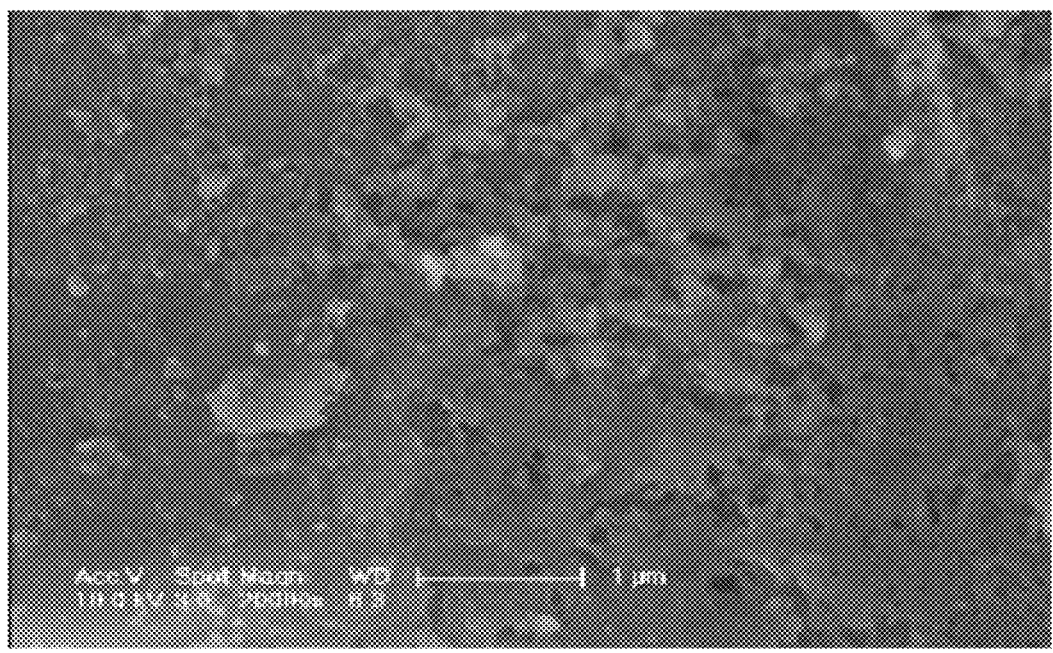
FIG. 5 shows a Scanning Electron Microscope (SEM) image on low magnification of the comparative example of $AlPO_4$ coated $LiCoO_2$ particles.

In Comparative Example 1, a comparative cathode composite material is prepared by using a conventional method. In the method, a water solution of (NH$_4$)$_2$HPO$_4$ and a water solution of Al(NO$_3$)$_3$ are mixed together and stirred to form a mixture including a plurality of small AlPO$_4$ particles dispersed in water. LiCoO$_2$ particles are added to the mixture, and the AlPO$_4$ particles are absorbed to the surfaces of the LiCoO$_2$ particles. The LiCoO$_2$ particles having the AlPO$_4$ particles absorbed thereon are filtered and heated at about 600° C., to form the comparative cathode composite material. Referring to FIG. 4 and FIG. 5, in the product, the AlPO$_4$ is in a particle shape aggregated on the surface of the LiCoO$_2$ particle. The AlPO$_4$ particles are aggregated together, and the coating is not uniform.

Comparative Example 2

In Comparative Example 2, a comparative cathode composite material is prepared in the same method as in Comparative Example 1, except that the LiCoO$_2$ particles in the Comparative Example 1 are replaced by the LiMn$_2$O$_4$ particles.

Comparative Examples 3 and 4

In the Comparative Examples 3 and 4, a comparative cathode composite material is prepared in the same method as in Comparative Example 1, except that the LiCoO$_2$ particles in Comparative Example 1 are respectively replaced by the LiNiO$_2$ and LiNi$_{0.8}$Co$_{0.15}$Al$_{0.05}$O$_2$ particles.

Comparative Example 5

In Comparative Example 5, a comparative anode composite material is prepared in the same method as in Comparative Example 1, except that the LiCoO$_2$ particles in Comparative Example 1 are replaced by the Li$_4$Ti$_5$O$_{12}$ particles.

Electrochemical Experiment 1

A half cell is assembled by using the cathode composite material formed in Example 1. The cathode composite material formed in Example 1, acetylene carbon black as a conductive agent, and polyvinylidene fluoride (PVDF) as a binder are mixed in N-methylpyrrolidone (NMP) in a mass ratio of about 90:5:5, to form a slurry. The slurry was applied to the surface of an aluminum foil and dried at about 100° C. to remove NMP, and achieve the cathode electrode. The anode electrode is lithium metal. 1 mol/L LiPF$_6$/EC+DEC (1:1) is used as an electrolyte solution. The separator is a porous polypropylene film. The assembled half cell is cycled at a current of about 0.5 C (C-rate) between a discharge cut-off voltage of 2.7V and a charge cut-off voltage of 4.5V at room temperature.

Electrochemical Experiment 2-4

Three half cells are assembled and cycled according to the same conditions as in the Electrochemical Experiment 1, except that the cathode composite material formed in Example 1 is respectively replaced by the cathode composite materials in Examples 2-4.

Figure 6:
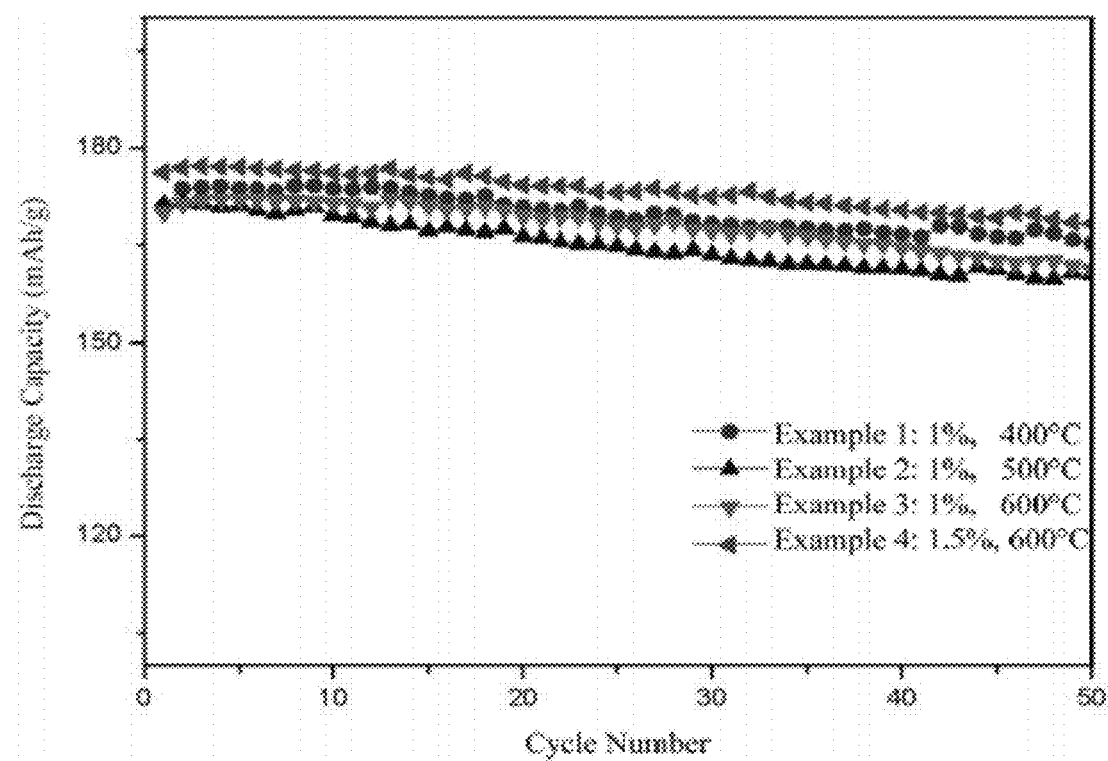
FIG. 6 is a graph comparing cycle performance testing results of half cells using the cathode electrode including $AlPO_4$ coated $LiCoO_2$ particles in Examples 1-4.

Referring to FIG. 6, the half cells of Examples 1-4 all use uniformly coated LiCoO$_2$ particles with AlPO$_4$ layer as the cathode active material, and have relatively high capacity in and capacity retention (i.e., capacity maintenance rate). After 50 cycles, the capacity retentions of the half cells are all above 90%, and the capacities are in a range from about 160 mAh/g to about 175 mAh/g. The half cell having the higher heat treating temperature has a higher capacity. However, the change in mass percentage of the AlPO$_4$ layer in the cathode composite material from 1% to 1.5% did not have much effect to the capacity of the half cell. The AlPO$_4$ layer modifies the surface structure of the LiCoO$_2$, provides a lithium intercalation/deintercalation platform, and works as a barrier layer to suppress the chemical reaction between Co$^{4+}$ and the electrolyte. Thus, the AlPO$_4$ layer improves the stability of the LiCoO$_2$, and the cycling performance of the lithium ion battery is improved.

Electrochemical Experiment 5

A half cell is assembled according to the same conditions as in Electrochemical Experiment 1, except that the cathode composite material formed in Example 1 is replaced by the cathode composite material in Example 5. The half cell has a relatively high capacity and capacity retention at both room temperature and a relatively high temperature (e.g., from about 15° C. to about 60° C.). The half cell is cycled at a current of about 0.2 C (C-rate) between a discharge cut-off voltage of 3V and a charge cut-off voltage of 4.2V at about 55° C. After 50 cycles, the capacity retentions of the half cell are above 90%, and the capacity is about 125 mAh/g.

Electrochemical Experiment 6

Figure 7:
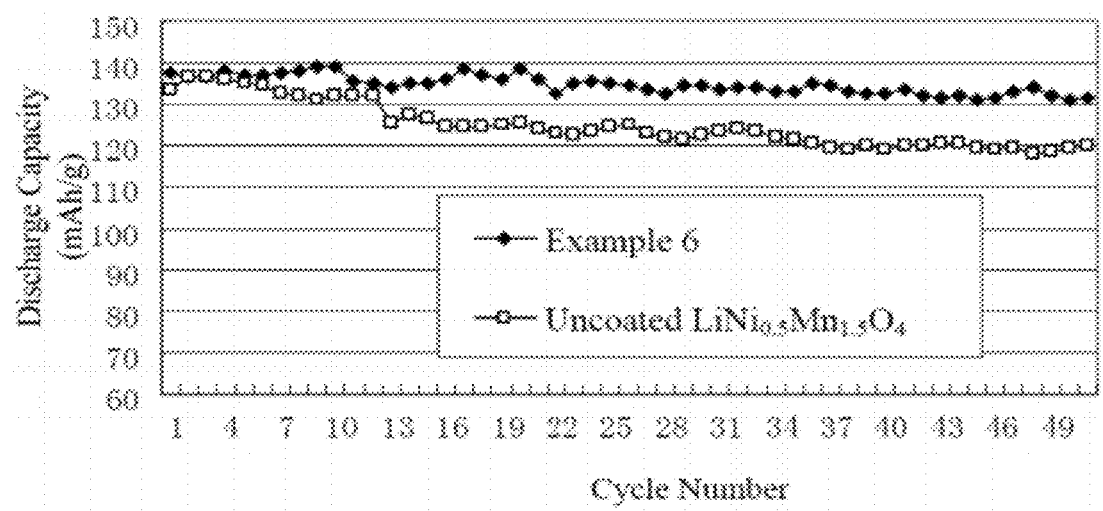
FIG. 7 is a graph comparing cycle performance testing results of half cells using the cathode electrode including $AlPO_4$ coated $LiNi_{0.5}Mn_{1.5}O_4$ particles in Example 6 and uncoated $LiNi_{0.5}Mn_{1.5}O_4$ particles.

A half cell is assembled according to the same conditions as in Electrochemical Experiment 1, except that the cathode composite material formed in Example 1 is replaced by the cathode composite material in Example 6. The half cell is cycled at a current of 0.2 C (C-rate) between a discharge cut-off voltage of 3V and a charge cut-off voltage of 5V at about room temperature. After 50 cycles, the capacity retentions of the half cell are above 95%, and the capacity is about 138 mAh/g. Referring to FIG. 7, the half cell is cycled at a current of about 1 C (C-rate) between 3V and 5V at about room temperature. After 50 cycles, the capacity retentions of the half cell are still above 95%, and the capacity is about 132 mAh/g.

Electrochemical Experiment 7

A half cell is assembled according to the same conditions as in Electrochemical Experiment 1, except that the cathode composite material formed in Example 1 is replaced by the cathode composite material in Example 7. The half cell is cycled at a current of about 0.5 C (C-rate) between a discharge cut-off voltage of 2.5V and a charge cut-off voltage of 4.5V at about room temperature. After 50 cycles, the capacity retentions of the half cell are above 85%, and the capacity is about 150 mAh/g.

Electrochemical Experiment 8

A half cell is assembled according to the same conditions as in Electrochemical Experiment 1, except that the cathode composite material formed in Example 1 is replaced by the cathode composite material in Example 8. The half cell is cycled at a current of about 0.5 C (C-rate) between a discharge cut-off voltage of 3.75V and a charge cut-off voltage of 4.5V at about room temperature. After 50 cycles, the capacity retentions of the half cell are above 91%, and the capacity is about 140 mAh/g.

Electrochemical Experiments 9 to 14

Six same half cells are assembled according to the same conditions as in Electrochemical Experiment 1, except that the cathode composite material formed in Example 1 is replaced by the cathode composite material in Example 9. The half cells are cycled 100 times at a current of about 1 C (C-rate) at about room temperature. Experiment results of the charge and discharge voltage conditions and the capacity retentions are shown in Table 1 and FIGS. 8-13.

TABLE 1

Figure 8:
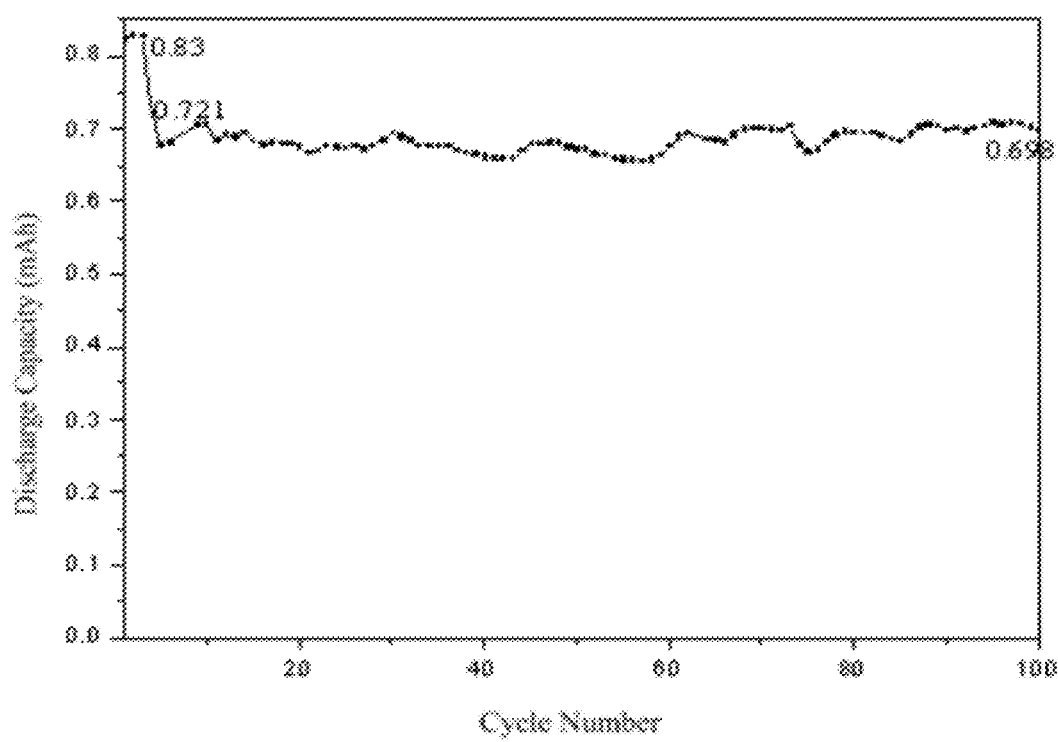
FIG. 8 is a graph showing a cycle performance testing result of a half cell using the cathode electrode including $AlPO_4$ coated $LiNi_{1/3}Co_{1/3}Mn_{1/3}O_2$ particles in Example 9 charged to 4.2V.
Figure 9:
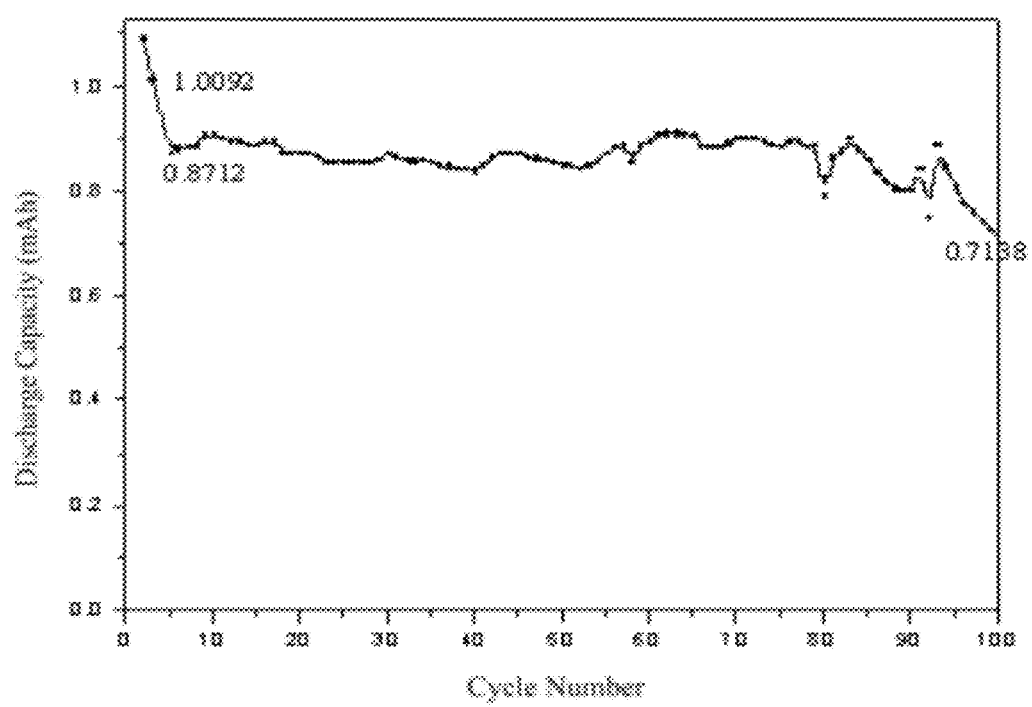
FIG. 9 is a graph showing a cycle performance testing result of a half cell using the cathode electrode including $AlPO_4$ coated $LiNi_{1/3}Co_{1/3}Mn_{1/3}O_2$ particles in Example 9 charged to 4.3V.
Figure 10:
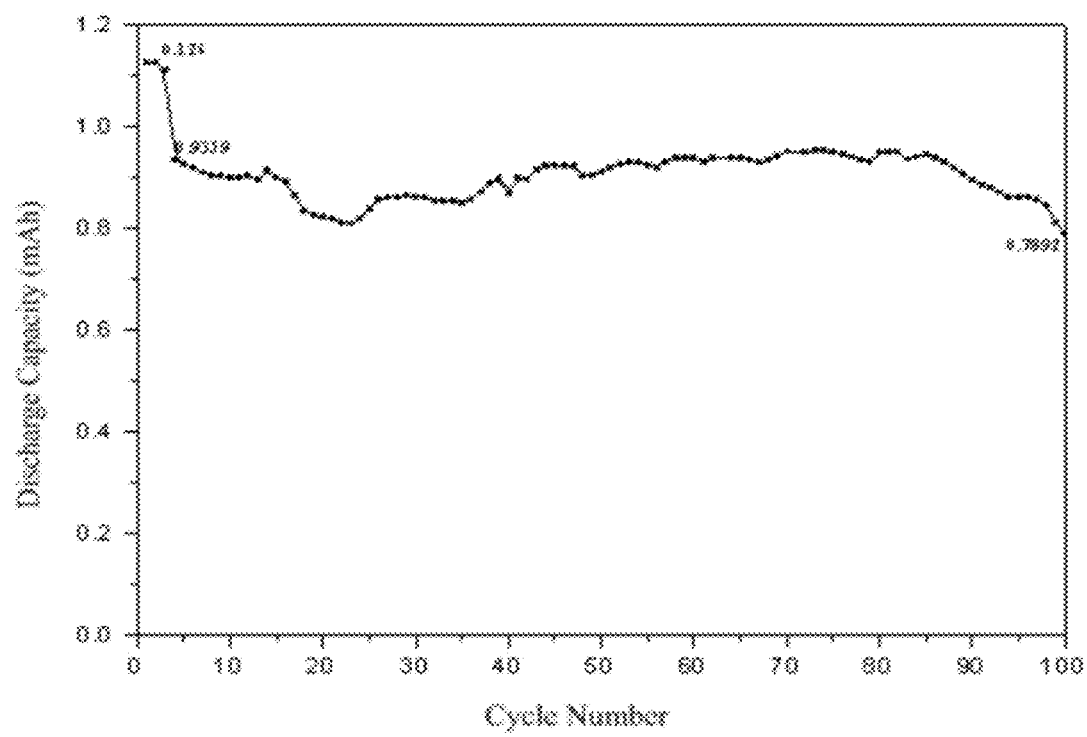
FIG. 10 is a graph showing a cycle performance testing result of a half cell using the cathode electrode including $AlPO_4$ coated $LiNi_{1/3}Co_{1/3}Mn_{1/3}O_2$ particles in Example 9 charged to 4.4V.
Figure 11:
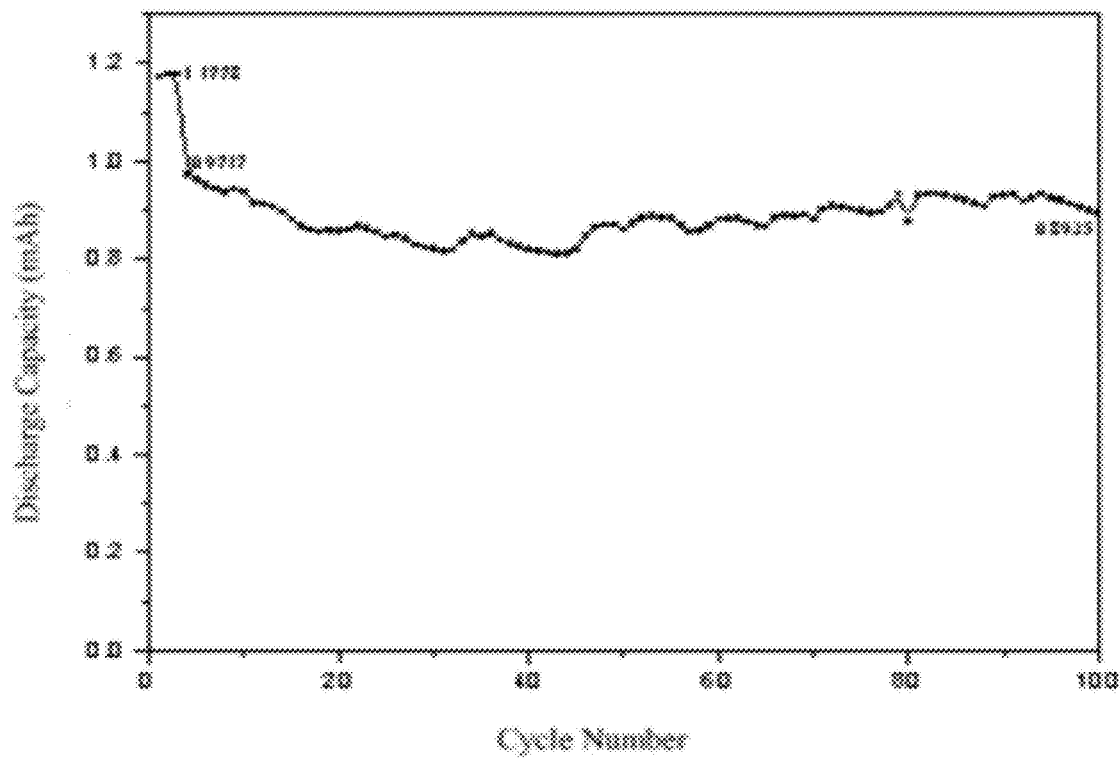
FIG. 11 is a graph showing a cycle performance testing result of a half cell using the cathode electrode including $AlPO_4$ coated $LiNi_{1/3}Co_{1/3}Mn_{1/3}O_2$ particles in Example 9 charged to 4.5V.
Figure 12:
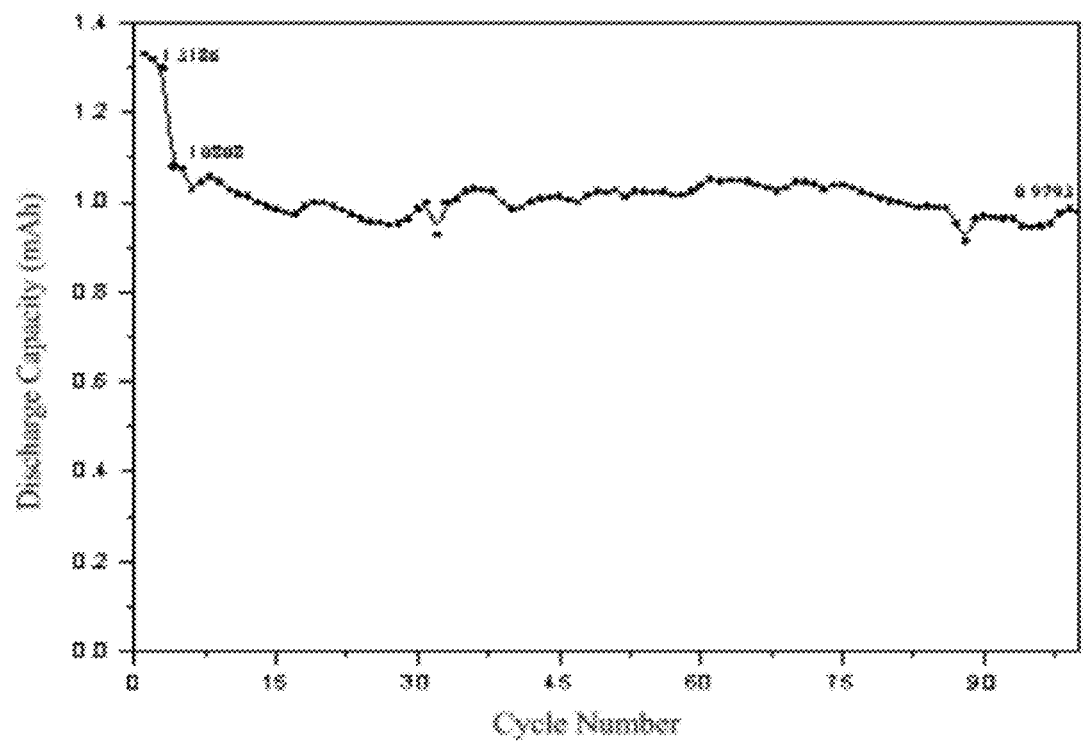
FIG. 12 is a graph showing a cycle performance testing result of a half cell using the cathode electrode including $AlPO_4$ coated $LiNi_{1/3}Co_{1/3}Mn_{1/3}O_2$ particles in Example 9 charged to 4.6V.
Figure 13:
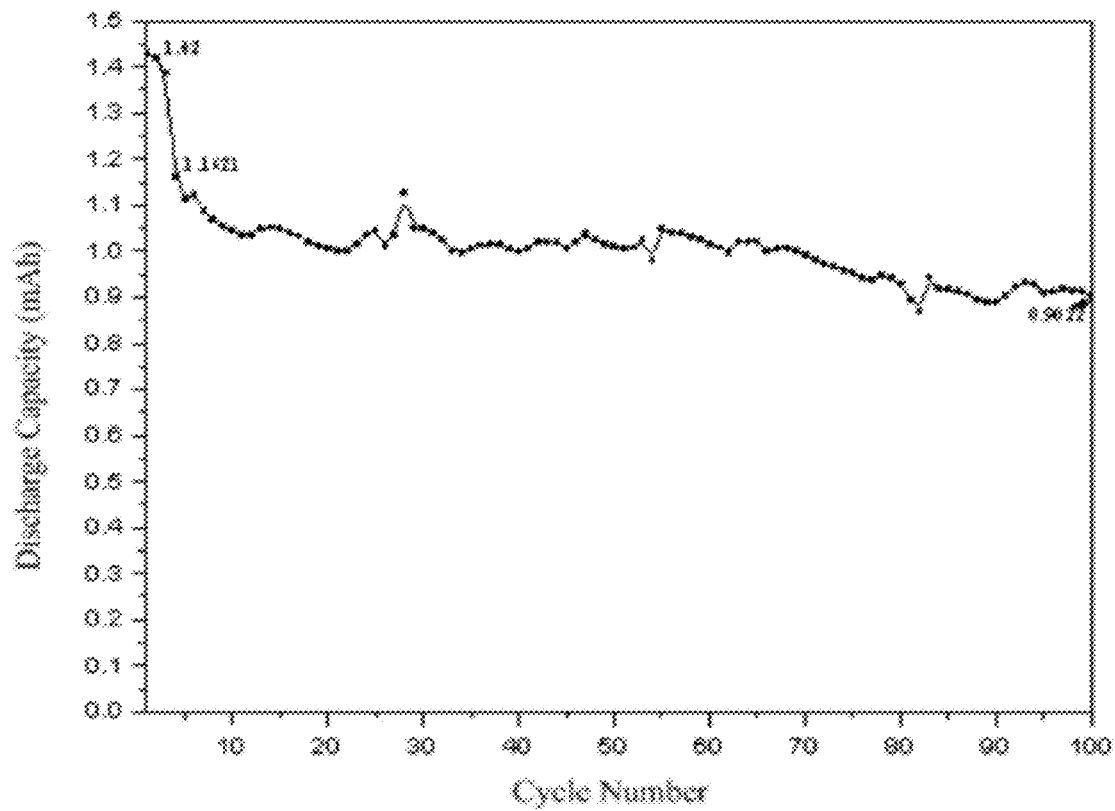
FIG. 13 is a graph showing a cycle performance testing result of a half cell using the cathode electrode including AlPO$_4$ coated LiNi$_{1/3}$Co$_{1/3}$Mn$_{1/3}$O$_2$ particles in Example 9 charged to 4.7V.

| Electrochemical Experiment Number | Corresponding Figure | Charge Cut-off Voltage (V) | Discharge Cut-off Voltage (V) | Capacity Retention |
|---|---|---|---|---|
| 9 | FIG. 8 | 4.2 | 2.7 | 96.8% |
| 10 | FIG. 9 | 4.3 | 2.7 | 81.9% |
| 11 | FIG. 10 | 4.4 | 2.7 | 84% |
| 12 | FIG. 11 | 4.5 | 2.7 | 91.96% |
| 13 | FIG. 12 | 4.6 | 2.7 | 90.6% |
| 14 | FIG. 13 | 4.7 | 2.7 | 77.64% |

As shown in Table 1, by charging to different voltages, the half cells all can have a relatively acceptable capacity retention at the current of 1 C. The capacity retention is about 90.6% when the half cell is charged to 4.6V which is a relatively high charge voltage.

Electrochemical Experiment 15

A half cell is assembled according to the same conditions as in Electrochemical Experiment 1, except that the cathode composite material formed in Example 1 is replaced by the anode composite material in Example 10. The half cell has a relatively high capacity and capacity retention at both room temperature and a relatively high temperature (e.g., from about 15° C. to about 60° C.). The half cell is cycled at a current of about 0.1 C (C-rate) between a discharge cut-off voltage of 0.8V and a charge cut-off voltage of 3V at about 55° C. After 50 cycles, the capacity retentions of the half cell are above 85%, and the capacity is about 160 mAh/g.

Comparative Experiment 1

A Half cell is assembled and cycled according to the same conditions as in Electrochemical Experiment 1, except that the cathode composite material formed in Example 1 is replaced by uncoated $LiCoO_2$ particles.

Comparative Experiment 2

Figure 14:
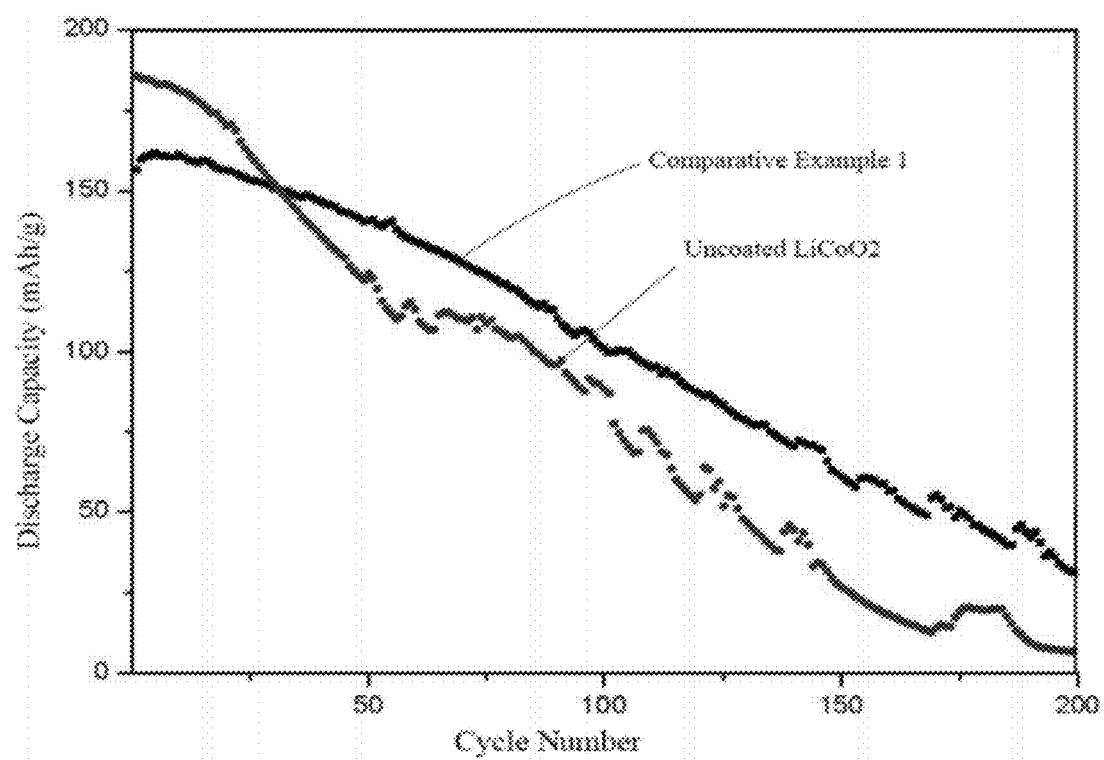
FIG. 14 is a graph showing cycle performance testing results of half cells using the cathode electrode including AlPO$_4$ coated LiCoO$_2$ particles in Comparative Example 1 and uncoated LiCoO$_2$ particles.

A half cell is assembled and cycled according to the same conditions as in Electrochemical Experiment 1, except that the cathode composite material formed in Example 1 is replaced by the comparative cathode composite material in Comparative Example 1.
Referring to FIG. 14, the half cells of the comparative cathode composite material in Comparative Example 1 and the uncoated $LiCoO_2$ particles both have a rapid drop of capacity. After 50 cycles, the capacity retentions of the two half cells are both smaller than 85%. This is mainly because the uneven coating or uncoated $LiCoO_2$ is relatively unstable at relative high charge cut-off voltage (e.g., 4.5V). At the high charge cut-off voltage, the $LiCoO_2$ may have a side reaction with the electrolyte, to decrease the capacity.

Comparative Experiment 3

A half cell is assembled and cycled according to the same conditions as in the Electrochemical Experiment 5, except that the cathode composite material formed in Example 5 is replaced by the comparative cathode composite material in Comparative Example 2. The half cell is cycled at a current of about 0.2 C (C-rate) between a discharge cut-off voltage of 3V and a charge cut-off voltage of 4.2V at about 55° C. After 50 cycles, the capacity retentions of the half cell are below 85%.

Comparative Experiment 4

A half cell is assembled and cycled according to the same conditions as in Electrochemical Experiment 6, except that the cathode composite material formed in Example 6 is replaced by the uncoated $LiNi_{0.5}Mn_{1.5}O_4$ particles. Referring to FIG. 7, the half cell is cycled at a current of about 1 C (C-rate) between a discharge cut-off voltage of 3V and a charge cut-off voltage of 5V at room temperature. After 50 cycles, the capacity retentions of the half cell are about 85%, and the capacity is about 118 mAh/g.

Comparative Experiment 5

A half cell is assembled and cycled according to the same conditions as in Electrochemical Experiment 7, except that the cathode composite material formed in Example 7 is replaced by the comparative cathode composite material in Comparative Example 3. After 50 cycles, the capacity retentions of the half cell are below 85%.

Comparative Experiment 6

A half cell is assembled and cycled according to the same conditions as in Electrochemical Experiment 8, except that the cathode composite material formed in Example 8 is replaced by the comparative cathode composite material in Comparative Example 4. After 50 cycles, the capacity retentions of the half cell are below 85%.

Comparative Experiments 7 to 12

Six half cells are assembled and cycled according to the same conditions as in Electrochemical Experiments 9 to 14, except that the cathode composite material formed in Example 9 is replaced by the comparative cathode composite material in the uncoated $LiNi_{1/3}CO_{1/3}Mn_{1/3}O_2$ particles. The half cells are cycled 100 times at a current of about 1 C (C-rate) at about room temperature. Experiment results of the charge and discharge voltage conditions and the capacity retentions are shown in Table 2 and FIGS. 15-20

TABLE 2

Figure 15:
FIG. 15 is a graph showing a cycle performance testing result of a half cell using the cathode electrode including uncoated LiNi$_{1/3}$Co$_{1/3}$Mn$_{1/3}$O$_2$ particles charged to 4.2V.
Figure 16:
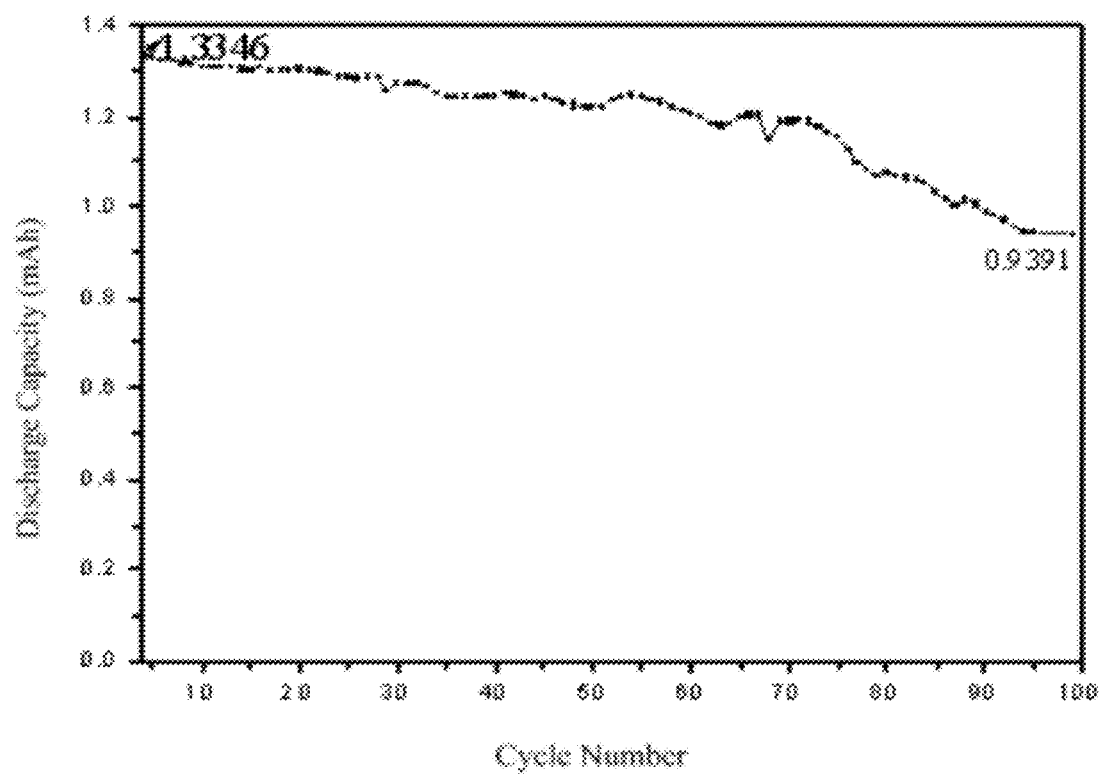
FIG. 16 is a graph showing a cycle performance testing result of a half cell using the cathode electrode including uncoated LiNi$_{1/3}$Co$_{1/3}$Mn$_{1/3}$O$_2$ particles charged to 4.3V.
Figure 17:
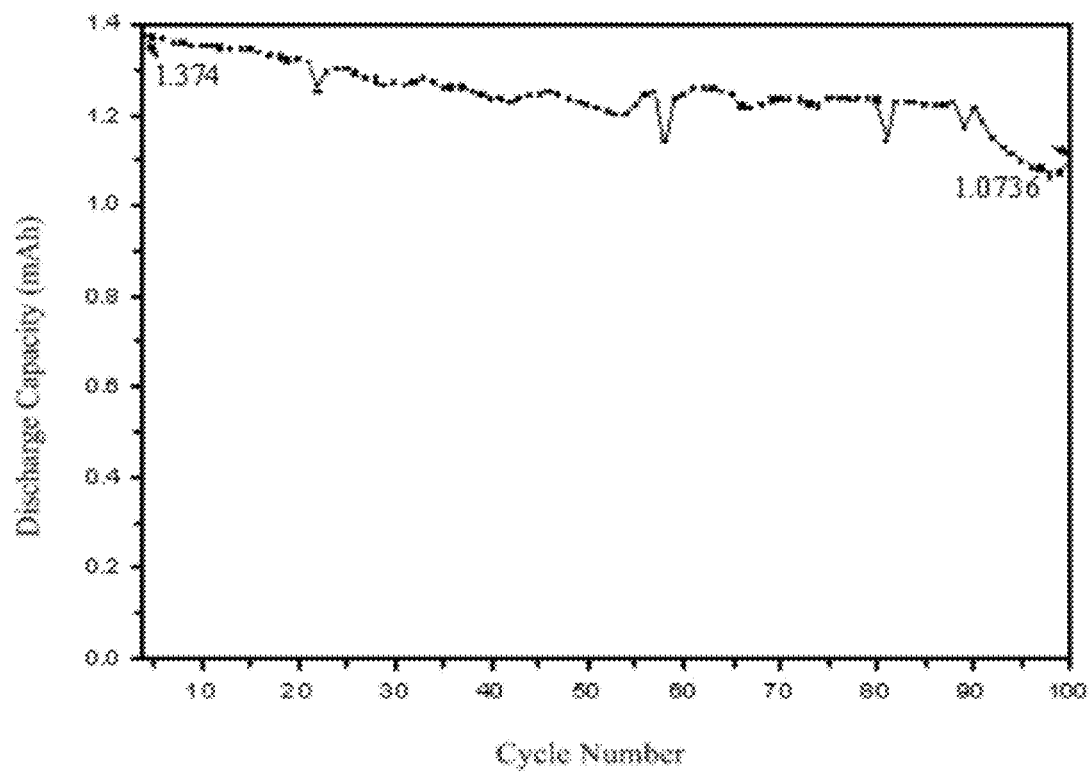
FIG. 17 is a graph showing a cycle performance testing result of a half cell using the cathode electrode including uncoated LiNi$_{1/3}$Co$_{1/3}$Mn$_{1/3}$O$_2$ particles charged to 4.4V.
Figure 18:
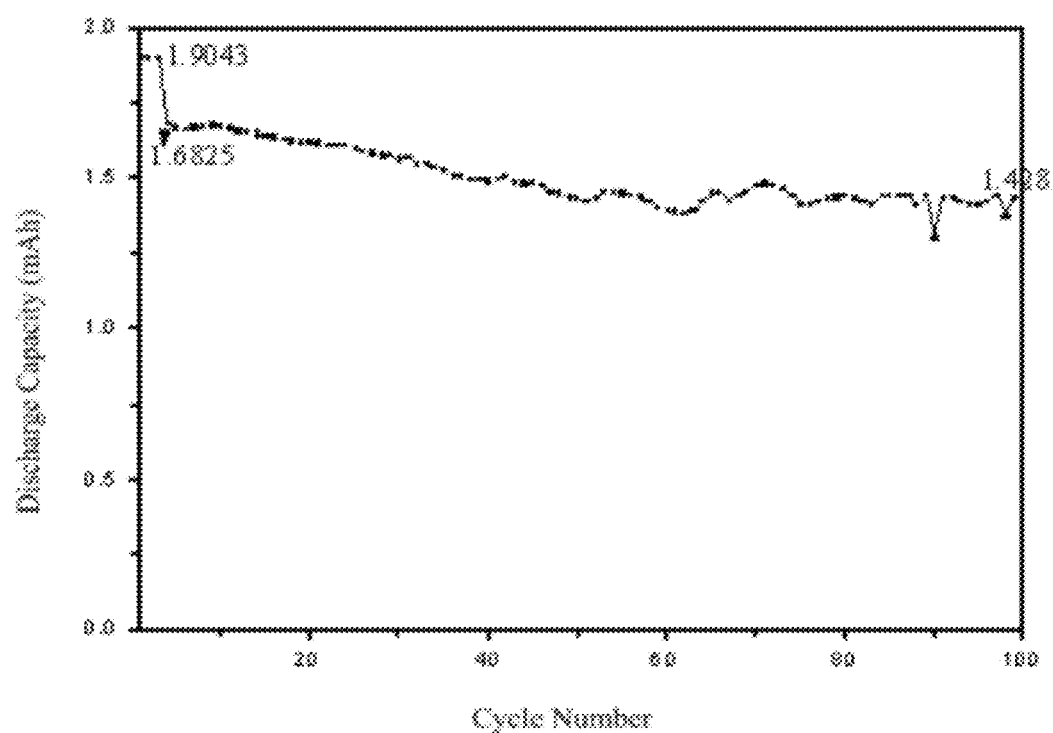
FIG. 18 is a graph showing a cycle performance testing result of a half cell using the cathode electrode including uncoated LiNi$_{1/3}$Co$_{1/3}$Mn$_{1/3}$O$_2$ particles charged to 4.5V.
Figure 19:
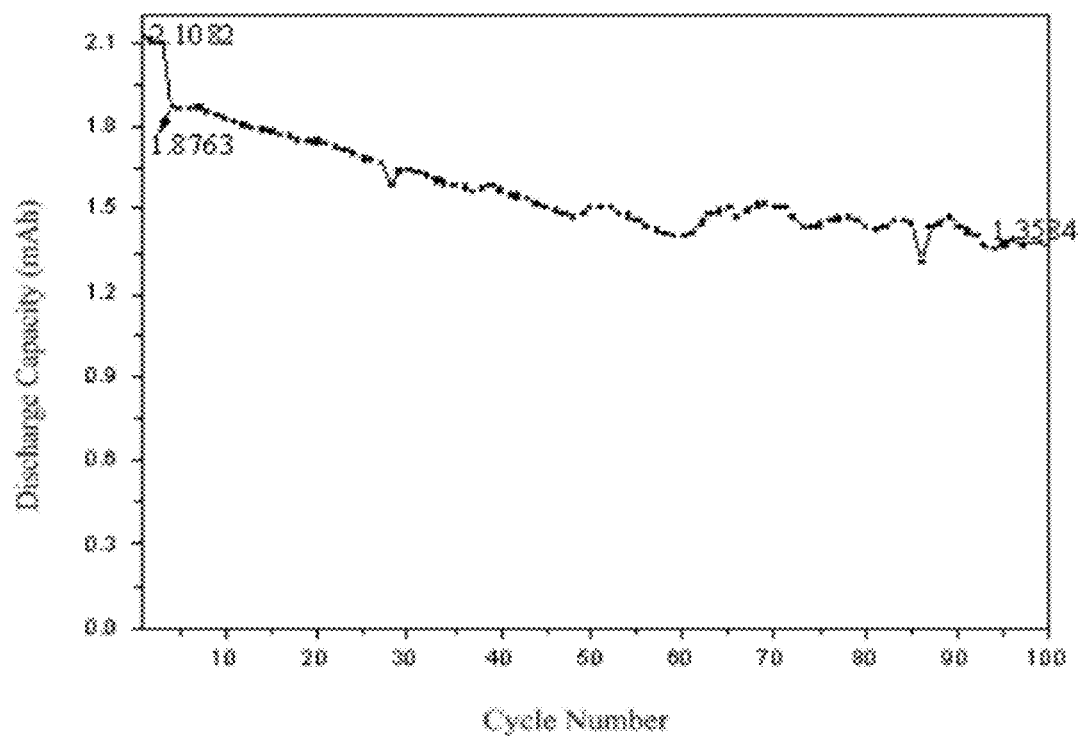
FIG. 19 is a graph showing a cycle performance testing result of a half cell using the cathode electrode including uncoated LiNi$_{1/3}$Co$_{1/3}$Mn$_{1/3}$O$_2$ particles charged to 4.6V.
Figure 20:
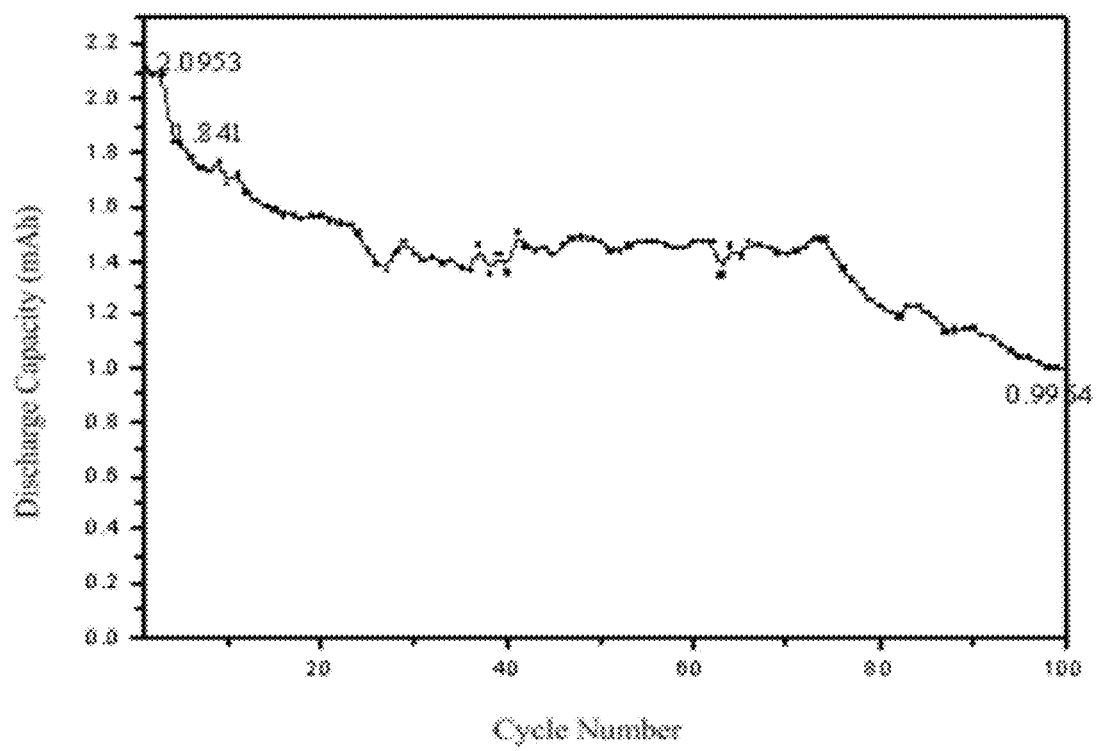
FIG. 20 is a graph showing a cycle performance testing result of a half cell using the cathode electrode including uncoated LiNi$_{1/3}$Co$_{1/3}$Mn$_{1/3}$O$_2$ particles charged to 4.7V.

| Comparative Experiment Number | Corresponding Figure | Charge Cut-off Voltage (V) | Discharge Cut-off Voltage (V) | Capacity Retention |
|---|---|---|---|---|
| 7 | FIG. 15 | 4.2 | 2.7 | 71.1% |
| 8 | FIG. 16 | 4.3 | 2.7 | 70.36% |
| 9 | FIG. 17 | 4.4 | 2.7 | 78.14% |
| 10 | FIG. 18 | 4.5 | 2.7 | 84.87% |
| 11 | FIG. 19 | 4.6 | 2.7 | 72.4% |
| 12 | FIG. 20 | 4.7 | 2.7 | 54.1% |

Referring to FIGS. 15 to 20, when the charge cut-off voltages are relatively low (e.g., at 4.4V and 4.5V), the cycling curves are relatively smooth, and after 100 cycles, the capacity retentions are above 78%. However, when the charge cut-off voltages are increased (e.g., 4.6V and 4.7V), the capacities apparently drop, especially after 70 cycles. This may because the $LiNi_{1/3}CO_{1/3}Mn_{1/3}O_2$ particles are uncoated. When the half cell using the uncoated $LiNi_{1/3}CO_{1/3}Mn_{1/3}O_2$ particles is charged to a high voltage, the internal resistance increases, and the charge and discharge efficiency decreases, to decrease the capacity of the half cell.

Comparing experiment results of the half cells as shown in FIGS. 8 to 13 using the cathode composite material of Example 9 with FIGS. 15 to 20 using the uncoated $LiNi_{1/3}CO_{1/3}Mn_{1/3}O_2$ particles, under the same conditions, the half cells using the coated $LiNi_{1/3}CO_{1/3}Mn_{1/3}O_2$ particles has smoother cycling curves and higher capacity retentions than the half cells using the uncoated $LiNi_{1/3}Co_{1/3}Mn_{1/3}O_2$ particles.

Comparative Experiment 13

A half cell is assembled and cycled according to the same conditions as in Electrochemical Experiment 15, except that the cathode composite material formed in Example 10 is replaced by the comparative cathode composite material in Comparative Example 5. After 50 cycles, the capacity retentions of the half cell are below 85%.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A cathode composite material comprising a cathode active material particle and a continuous aluminum phosphate layer coated on a surface of the cathode active material particle, wherein a material of the cathode active material particle is $LiNi_{0.8}Co_{0.15}Al_{0.05}O_2$.

2. The cathode composite material of claim 1, wherein a mass percentage of the continuous aluminum phosphate layer is in a range from about 0.1% to about 3%.

3. The cathode composite material of claim 1, wherein a mass percentage of the continuous aluminum phosphate layer is about 1%.

4. The cathode composite material of claim 1, wherein a thickness of the continuous aluminum phosphate layer is in a range from about 5 nanometers to about 20 nanometers.

5. The cathode composite material of claim 1, wherein the continuous aluminum phosphate layer has a uniform thickness and is an in situ formed layer on the surface of the cathode active material particle.

6. The cathode composite material of claim 1, wherein a diameter of the cathode active material particle is in a range from about 100 nanometers to about 100 microns.

7. The cathode composite material of claim 1, wherein a diameter of the cathode active material particle is in a range from about 1 micron to about 20 microns.

8. The cathode composite material of claim 1, wherein the continuous aluminum phosphate layer and the cathode active material particle are diffused at an interface between the continuous aluminum phosphate layer and the cathode active material particle.

9. A lithium ion battery comprising:
    an anode electrode;
    a cathode electrode comprising a cathode composite material comprising a plurality of cathode active material particles and a continuous aluminum phosphate layer coated on a surface of each of the plurality of cathode active material particles; and
    a non-aqueous electrolyte disposed between the cathode and the anode,
    wherein a material of the cathode active material particle is $LiNi_{0.8}Co_{0.15}Al_{0.05}O_2$.

10. The lithium ion battery of claim 9, wherein the cathode electrode comprises a cathode current collector and a cathode material layer disposed on a surface of the cathode current collector, the cathode material layer comprising the cathode composite material, a conductive agent, and a binder.

11. The lithium ion battery of claim 9, wherein a capacity retention is above 85% after about 50 cycles with a charge cut-off voltage of 4.5V.

* * * * *